US007162114B2

(12) United States Patent
Donval et al.

(10) Patent No.: US 7,162,114 B2
(45) Date of Patent: Jan. 9, 2007

(54) OPTICAL ENERGY SWITCHING DEVICE AND METHOD

(75) Inventors: Ariela Donval, Ramat Gan (IL); Doron Nevo, Ra'anana (IL); Moshe Oron, Rehovot (IL); Ram Oron, Rehovot (IL)

(73) Assignee: KiloLampda Technologies Ltd., Tel-Aviv (IL)

( * ) Notice: Subject to any disclaimer, the term of this patent is extended or adjusted under 35 U.S.C. 154(b) by 267 days.

(21) Appl. No.: 10/507,575

(22) PCT Filed: Mar. 13, 2003

(86) PCT No.: PCT/IB03/00928

§ 371 (c)(1),
(2), (4) Date: Sep. 10, 2004

(87) PCT Pub. No.: WO03/076971

PCT Pub. Date: Sep. 18, 2003

(65) Prior Publication Data

US 2005/0111782 A1    May 26, 2005

Related U.S. Application Data

(60) Provisional application No. 60/401,511, filed on Aug. 7, 2002, provisional application No. 60/364,161, filed on Mar. 13, 2002.

(51) Int. Cl.
*G02B 6/26* (2006.01)
(52) U.S. Cl. .......................................... 385/16; 385/33
(58) Field of Classification Search ................ 385/16
See application file for complete search history.

(56) References Cited

U.S. PATENT DOCUMENTS

| | | | | |
|---|---|---|---|---|
| 3,891,302 A | | 6/1975 | Dabby et al. ................. 350/96 |
| 3,914,464 A | | 10/1975 | Thomasson et al. .......... 427/54 |
| 4,476,363 A | * | 10/1984 | Berggren et al. ............ 219/693 |
| 4,732,449 A | | 3/1988 | Fan ......................... 350/96.18 |
| 4,733,931 A | | 3/1988 | Fan ......................... 350/96.18 |
| 5,341,238 A | | 8/1994 | Trost et al. .................. 359/359 |
| 5,436,759 A | * | 7/1995 | Dijaili et al. ................ 359/333 |
| 5,619,600 A | | 4/1997 | Pohl ............................. 385/15 |
| 5,689,595 A | | 11/1997 | Pan .............................. 385/27 |
| 6,124,080 A | * | 9/2000 | Mizuta et al. .............. 430/321 |
| 6,181,848 B1 | | 1/2001 | Bruno et al. .................. 385/24 |
| 6,466,707 B1 | | 10/2002 | Dawes et al. ................. 385/14 |
| 6,487,339 B1 | | 11/2002 | Nishikawa ..................... 385/32 |
| 6,778,316 B1 | * | 8/2004 | Halas et al. ................. 359/296 |
| 7,037,727 B1 | * | 5/2006 | Miura et al. ................. 436/518 |
| 2003/0035613 A1 | * | 2/2003 | Huber et al. .................. 385/16 |
| 2006/0127931 A1 | * | 6/2006 | Schmidt et al. ................ 435/6 |

* cited by examiner

*Primary Examiner*—Ellen E. Kim
(74) *Attorney, Agent, or Firm*—Jenkens & Gilchrist

(57) ABSTRACT

An optical power or energy-switching device, comprising an optical waveguide having an input section and an output section, the two sections forming a pair of opposed surfaces extending transversely through the axes of said waveguide sections, and a thin, substantially transparent layer of electrically conductive material disposed between said opposed surfaces, said layer of conductive material forming a plasma when exposed to optical signals propagating within said optical waveguide with an optical power level above a predetermined threshold, said plasma damaging said opposed surfaces sufficiently to render said surfaces substantially opaque to light propagating within said optical waveguide so as to prevent the transmission of such light.

47 Claims, 14 Drawing Sheets

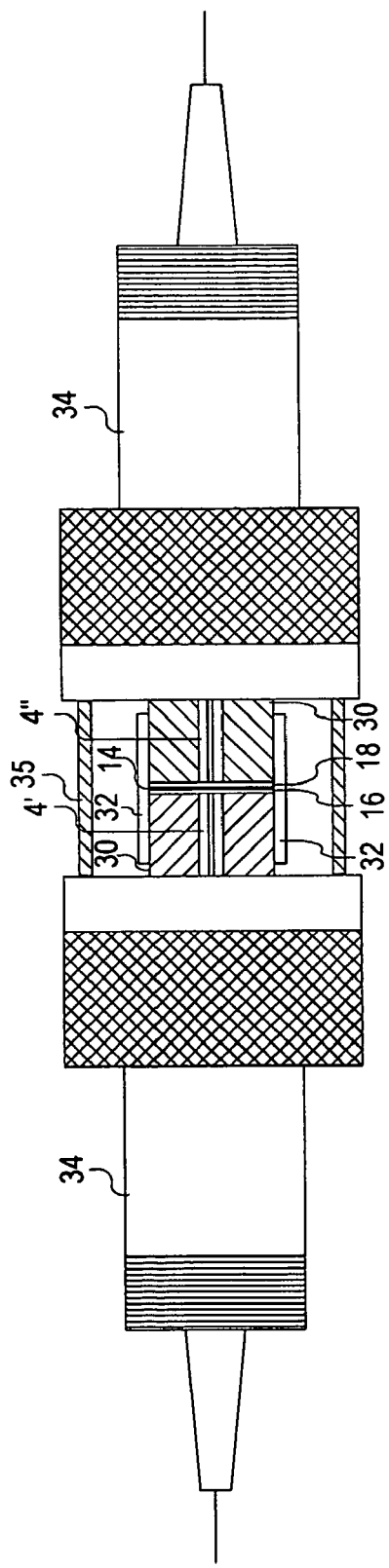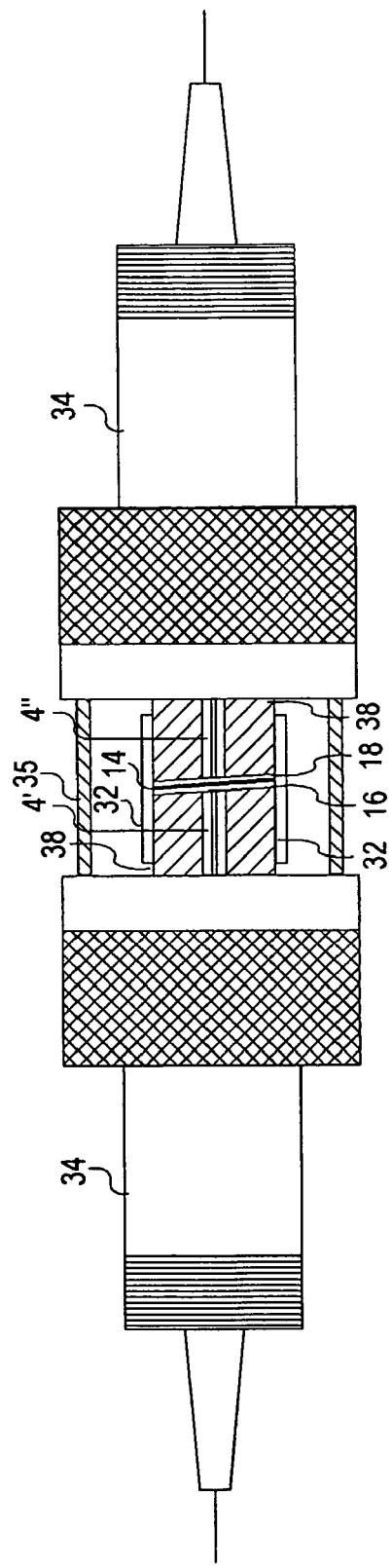

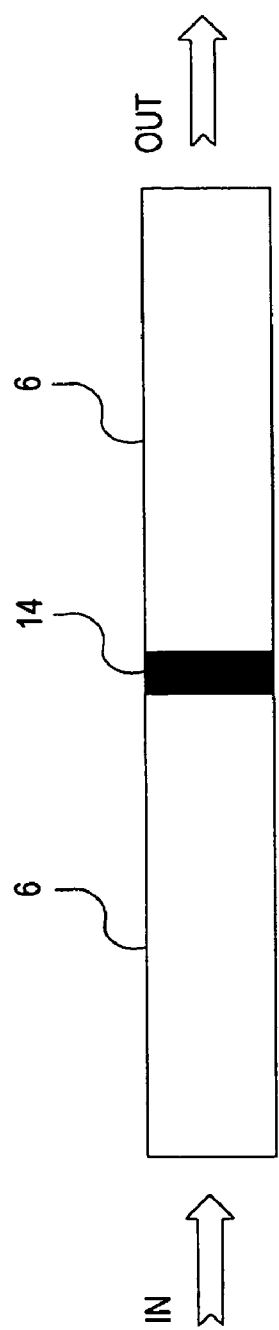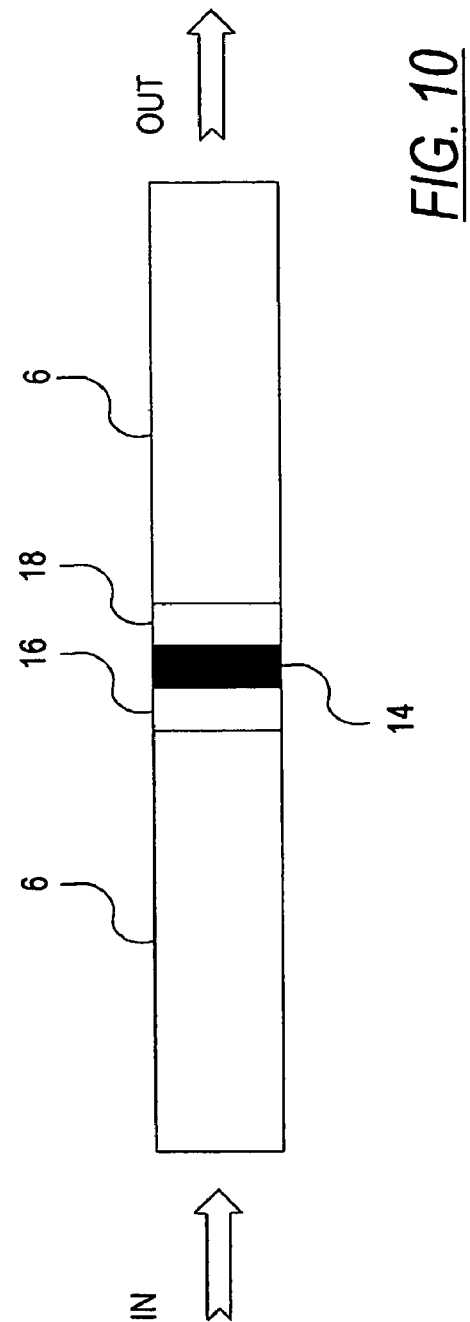

OPTICAL ENERGY SWITCHING DEVICE AND METHOD

This application is a 371 of PCT/IB03/00928 filed on Mar. 13, 2003, which claims benefit of 60/364,161 filed on Mar. 13, 2002, and claims benefit of 60/401,511 filed on Aug. 7, 2002.

FIELD OF THE INVENTION

The present invention relates to optical power switching devices and methods, and particularly to such devices and methods for interrupting or reducing the optical transmission in response to the transmission of excessive optical power or energy.

BACKGROUND OF THE INVENTION

Fiber lasers, fiber optics for communication systems, and other systems for light delivery, such as in medical, industrial and remote sensing applications, often handle high levels of optical power, namely, up to several Watts in a single fiber or waveguide. When these high specific intensities or power per unit area are introduced into the systems, many thin film coatings, optical adhesives and even bulk materials, are exposed to light fluxes beyond their damage thresholds and are eventually damaged. Another issue of concern in such high-power systems is laser safety, where well-defined upper limits are established for powers emitted from fibers. These two difficulties call for a passive device that will switch off the power propagating in a fiber or waveguide, when the power exceeds the allowed intensity. Such a switching device should be placed either at the input of a sensitive optical device, or at the output of a high-power device such as a laser or an optical amplifier, or integrated within an optical device.

In the past, there have been attempts to realize an optical safety shutter, mainly for high-power laser radiation and high-power pulsed radiation; special efforts were devoted to optical sights and eye safety devices. The properties on which these prior art solutions were based included: (1) self-focusing or self-defocusing, due to a high electric-field-induced index change through the third order susceptibility term of the optical material, and (2) reducing the optical quality of a gas or a solid transparent insert positioned at the cross-over spot of a telescope, by creating a light-absorbing plasma in the cross-over point. These are described in U.S. Pat. No. 3,433,555 and U.S. Pat. No. 5,017,769. U.S. Pat. No. 3,433,555 describes a plasma that is created in a gas where the gas density is low (lower than solids and liquids) and the density of the plasma created by the gas is low as well, limiting its absorption to the medium and far infrared part of the light spectrum. This device is not absorbing in the visible and near-infrared regions and cannot protect in these regions of the spectrum. U.S. Pat. No. 5,017,769 describes the use of a solid insert in the crossover point. This transparent insert is covered with carbon particles on its surface, enhancing the creation of a plasma on the surface at lower light intensities. The plasma density is high, since it starts from solid material. The dense plasma absorbs visible as well as infrared light, and the device is equipped with multiple inserts on a motorized rotating wheel that exposes a new, clean and transparent part after every damaging pulse. The two devices described above, namely U.S. Pat. Nos. 3,433,555 and 5,017,769, are large in their volume, work in free space and require high pulsed powers.

Passive devices were proposed in the past for image display systems. These devices generally contained a mirror that was temporarily or permanently damaged by a high-power laser beam that damaged the mirror by distortion or evaporation. Examples for such devices are described in U.S. Pat. Nos. 6,384,982, 6,356,392, 6,204,974 and 5,886,822. The powers needed here are in the range of pulsed or very energetic CW laser weapons and not in the power ranges for communication or medical devices. The distortion of a mirror by the energy impinging on it is very slow and depends on the movement of the large mass of the mirror as well as the energy creating the move. The process of removing a reflective coating from large areas is also slow, since the mirror is not typically placed in the focus where power is spatially concentrated. Another passive device was proposed in U.S. Pat. No. 621,658B1, where two adjacent materials were used. The first material was heat-absorbing, while the second material was heat-degradable. When these two materials were inserted into a light beam, the first material was heated and transferred its heat to the second material to degrade the transparency or reflectivity of the second material. This process is relatively slow, since heat-transfer times are slow, and in many cases not sufficiently fast to interrupt a light beam before damage occurs to objects along the optical line. In addition, the process of temperature-induced degradation often does not provide enough opacity to efficiently prevent damage from high-power spikes that are a known phenomenon in laser-fiber amplifiers.

Better, faster and more opaque solutions are needed. The present invention provides such a solution.

SUMMARY OF THE INVENTION

It is a broad object of the present invention to provide an improved passive safety switch for optical waveguides or fiber optics used internally in optical systems and either at the input or output port of an optical device or system.

It is a further object of the present invention to provide an improved safety switch for use in optical waveguide or optical fiber systems, the switch having a predetermined optical power transmission threshold.

It is a still a further object of the present invention to provide a safety switch for use in a waveguide or optical fiber, the switch being activated by a broad range of wavelengths.

It is a further object of the present invention to provide an improved safety switch for use in optical waveguide or optical fiber systems, the switch having a predetermined optical power transmission threshold and able to switch off the power in the forward direction as well as preventing the damaging phenomenon called "Fiber Fuse" from damaging the input fibers, in the backward (toward the laser source) direction.

The "Fiber Fuse" is a phenomenon that results in the catastrophic destruction of an optical fiber core. It has been observed at laser powers on the order of $3 \times 10^6$ watts/cm$^2$ in the core. This phenomenon is characterized by the propagation of a bright visible light from the point of initiation toward the laser source. The term "Fiber Fuse" has been adapted to the phenomenon because of the similarity in appearance to a burning fuse. The "Fiber Fuse" has been shown to occur when the end of the fiber is contaminated, and it has also been initiated spontaneously from splices and in-core disturbances. The "Fiber Fuse" event can destroy many kilometers of waveguide or fiber.

The present invention includes at least four different versions of optical power switching devices, as follows:

1. Two co-linear waveguides separated by a gap, where the switch is interposed transversely in the gap.
2. Two co-linear waveguides separated by a gap, where the switch is a third waveguide of different structure and materials, interposed in the gap.
3. A waveguide having a mechanically weakened place along its path, and the weak place breaks at a predetermined optical power throughput.
4. An assembly of one of the above switches (1 or 2 or 3) together with additional optical components, protecting against the damaging phenomenon called "Fiber Fuse" in the forward and backward optical power throughput.

Version 1: Two co-linear waveguides separated by a gap, where the switch is interposed transversely in the gap, comprising:

an optical waveguide having an input section and an output section, the two sections are aligned, forming a gap between them, or a pair of opposed surfaces extending transversely through the axes of the waveguide sections, and a thin, substantially transparent, layer of electrically conductive or semi conducting material disposed between the opposed surfaces of the waveguide sections, the material forming a plasma or breakdown when exposed to optical signals propagating within the optical waveguide with an optical power level above a predetermined threshold, the plasma or breakdown damaging the opposed surfaces sufficiently to render those surfaces substantially opaque, i.e., absorbing and/or scattering the light propagating within the optical waveguide so as to prevent the transmission of such light.

The visible light emitted by the plasma can be detected by a photo-detector and used as an indication that the light intensity passing through the switch exceeds its designed threshold.

Version 2: Two co-linear waveguides separated by a gap, where the switch is a third waveguide of different structure and materials, interposed in the gap, comprising:

an optical waveguide having an input section and an output section, the two sections forming a gap between them where a pair of opposed surfaces extend transversely through the axes of the waveguide sections, and a short, third, waveguide interposed between the two waveguides, in the gap, composed of materials and structures that will cause melt down and/or destruction of the core when exposed to optical powers above a threshold, rendering a volume substantially opaque, i.e., absorbing, diffracting and scattering the light propagating within the optical waveguide so as to prevent the transmission of such light.

Version 3: A waveguide having a mechanically weakened place along its path, the weak place breaks at a predetermined optical power throughput, comprising:

an optical waveguide, partially absorbing, having an input section and an output section, and a mechanically weakened spot in the waveguide, that causes a break when exposed to optical powers above a threshold. The optical power, partially absorbed, creates thermal stresses in the waveguide, and at the weak point the stresses are the highest.

Version 4: An assembly of one of the above switches (version 1 or 2 or 3) together with additional optical components, protecting against the damaging phenomenon called "Fiber Fuse", by confining the damaging phenomenon to a short sacrificial waveguide length inside the switch assembly.

The switch can be manufactured and used as a discrete component, with connectors on both ends or with splices on both ends. Alternatively, the switch can be built into a system where waveguides lead to and from the switch, without the use of connectors or splices.

Switches with threshold powers ranging from a few milliwatts up to about a few watts have been built and tested for threshold-power, insertion loss, return loss, added opacity or power drop, after exposure to threshold and higher powers, timing, endurance and visual (microscopic) inspection before and after damage.

The tests included time domain experiments, where switches were exposed to short pulses (down to tens of ns). The switches reacted in the same way as in the continuous-wave case, i.e., a large drop in their transparency when impinged by powers over the threshold. Insertion losses of less than 1 dB and return losses higher than 45 dB were obtained. Additionally, parameters such as broad-spectrum operation of the switch, modulated optical powers at the GHz range and higher, and endurance for hundreds of hours of powers a few dB lower than the threshold, were tested and found satisfactory.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the Drawings:

FIG. 1 is a schematic, cross-sectional view of an optical power-switching device embodying the present invention.

FIG. 2 is a schematic cross-sectional view of a modified optical power switching embodying the invention.

FIG. 3 is a schematic cross-sectional view of an optical power-switching device embodying the invention in a connector-like assembly.

FIG. 4 is a schematic cross-sectional view of a modified optical power-switching device embodying the invention in a connector-like assembly.

FIG. 5 is a schematic cross-sectional view of an optical power-switching device embodying the invention in a ferrule assembly.

FIG. 6 is a schematic cross-sectional view of a modified optical power-switching device embodying the invention in a ferrule assembly.

FIG. 7 is a schematic cross-sectional view of an optical power-switching device embodying the invention in a bare fiber assembly.

FIG. 8 is a schematic cross-sectional view of a modified optical power-switching device embodying the invention in a bare fiber assembly.

FIG. 9 is a schematic cross sectional view of the thin layers, conductor only version, in a transverse and angled configuration, in a spliced assembly.

FIG. 10 is a schematic cross sectional view of the thin layers, conductor and anti reflection layers version, in a transverse and angled configuration, in a spliced assembly.

FIG. 11 is an experimental curve of output power versus input power for a switch having a 30 dBm-input-power threshold.

Figure 12:
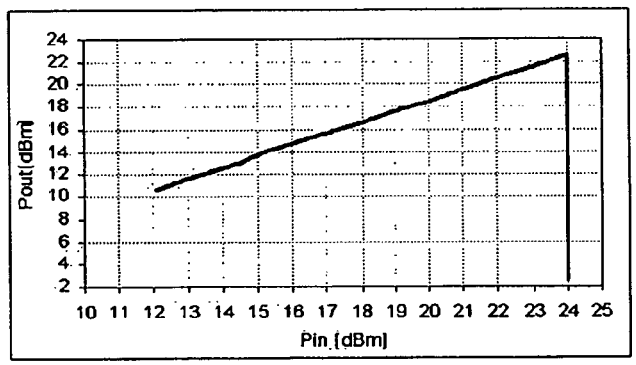

FIG. 12 is an experimental curve of output power versus input power for a switch having 24 dBm-input-power threshold.

Figure 13:
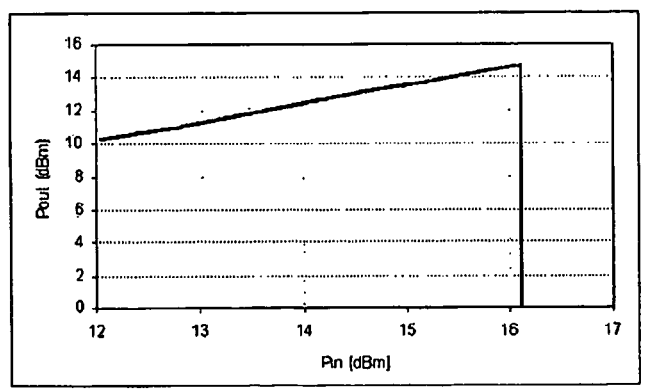

FIG. 13 is an experimental curve of output power versus time for the switches above.

Figure 14:
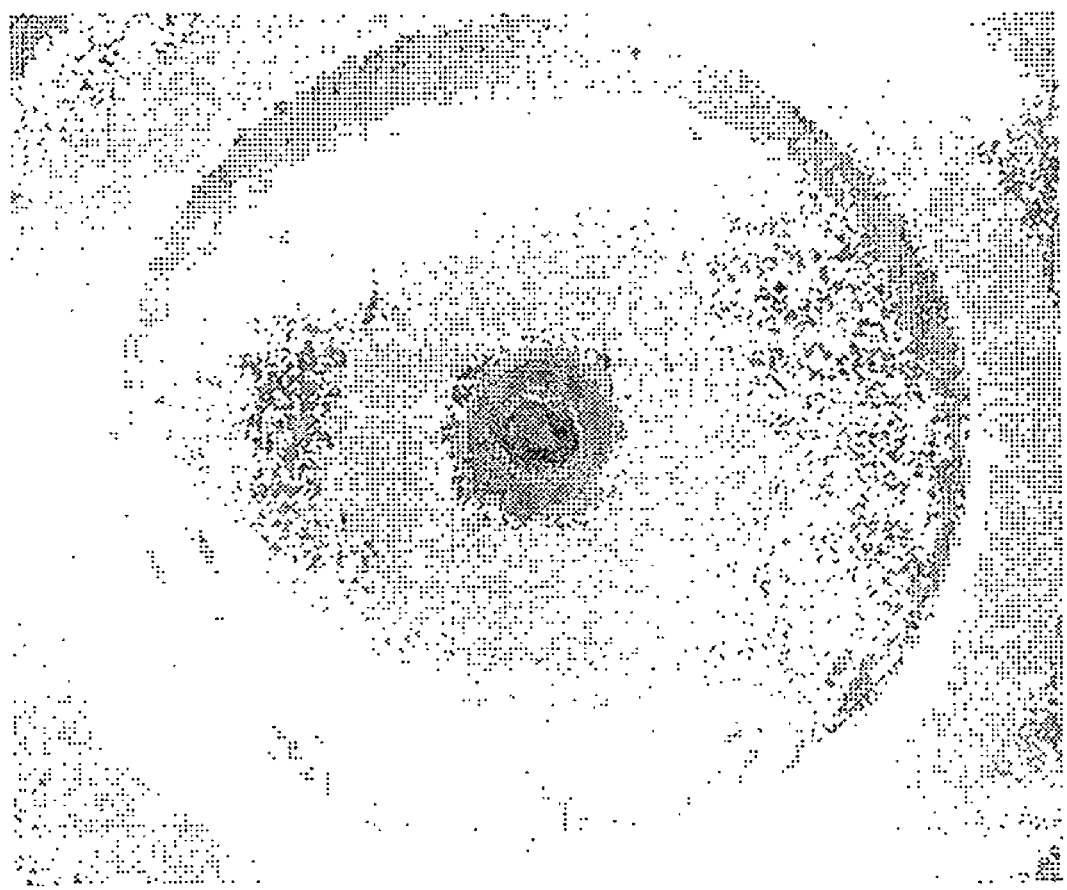

FIG. 14 is an experimental microscopic view of a damaged (opaque) switch with a crater or craters in the core of the waveguide.

Figure 15:
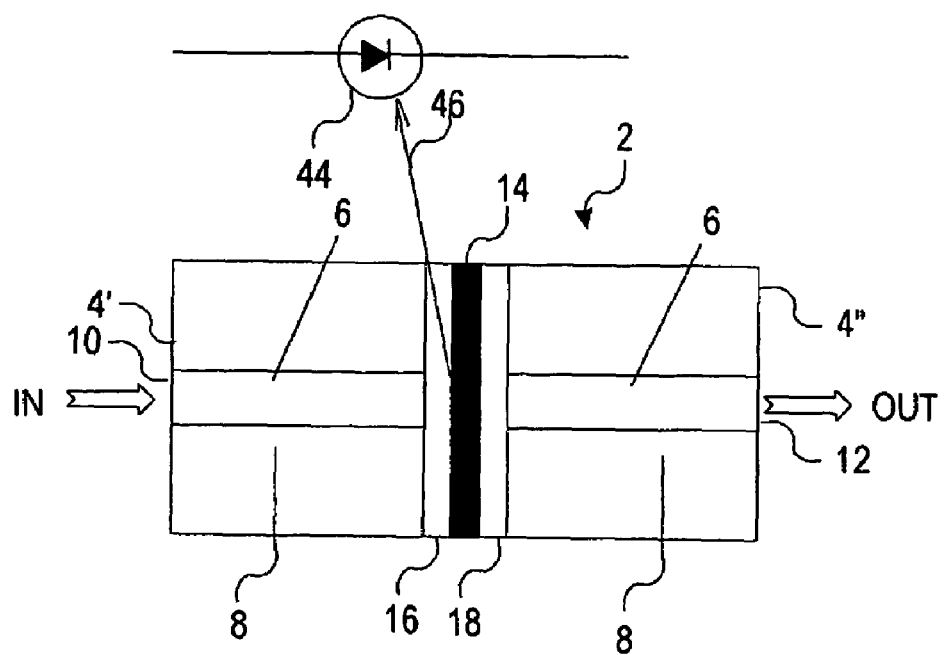

FIG. 15 is a schematic illustration of a further embodiment of the invention that includes a light detector detecting discharge-emitted light for switch failure detection.

Figure 16:
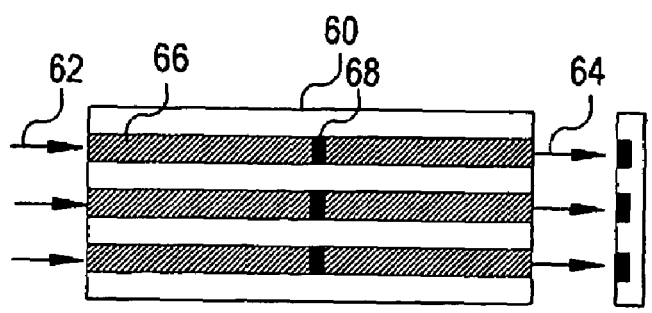

FIG. 16 is a schematic illustration of an embodiment of the invention that includes a plurality of switches in one stack, for corresponding waveguides in a stack.

Figure 17:
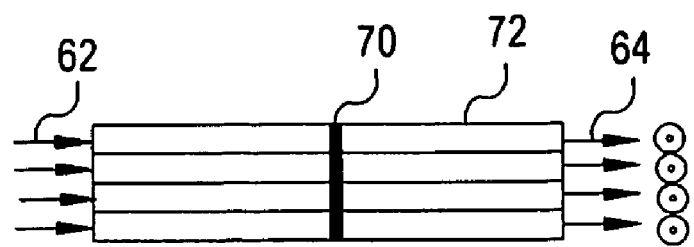

FIG. 17 is a schematic illustration of a further embodiment of the invention that includes a plurality of switches in one stack, for corresponding optical fibers in a stack.

Figure 18:
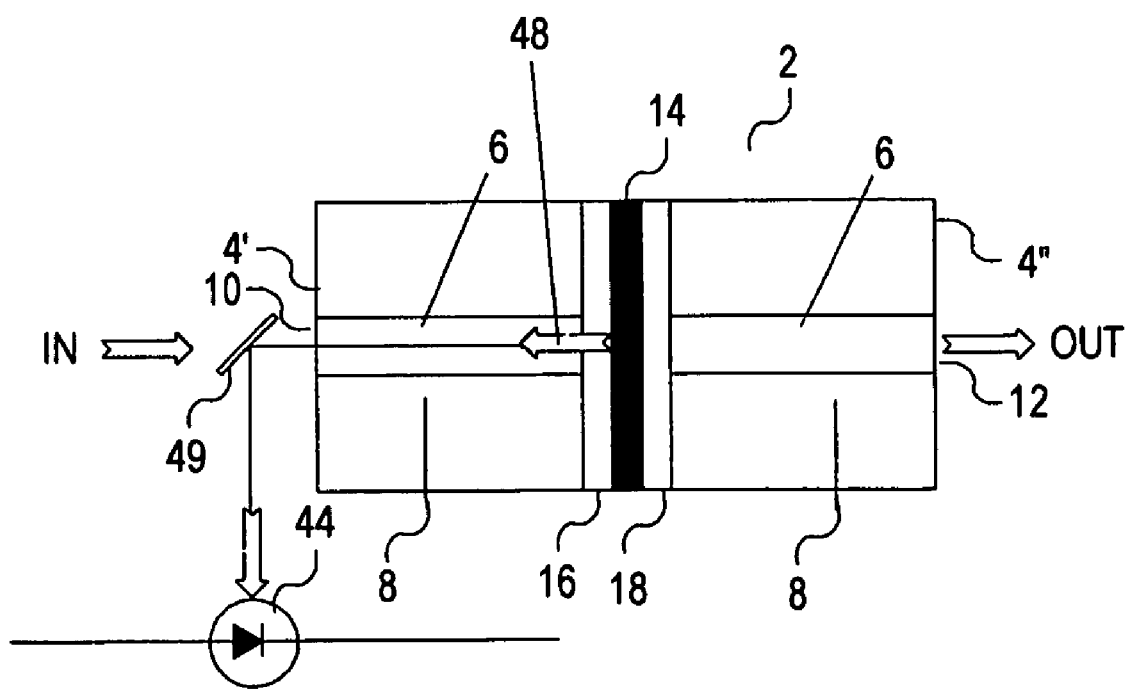

FIG. 18 is a schematic illustration of a further embodiment of the invention that includes a detector for back-reflected light for switch failure detection.

Figure 19:
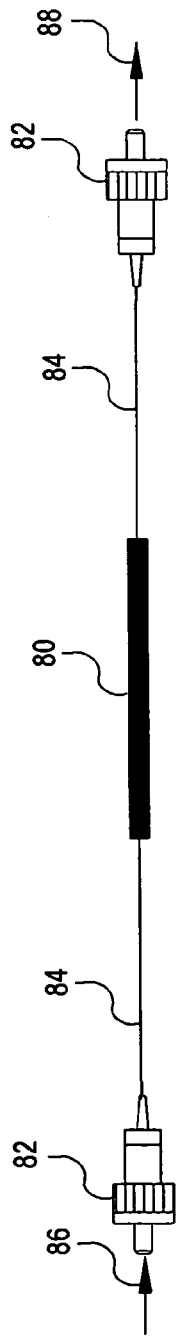

FIG. 19 is a schematic illustration of a further embodiment of the invention that includes PC or APC connectors end connections for the optical switch.

Figure 20:
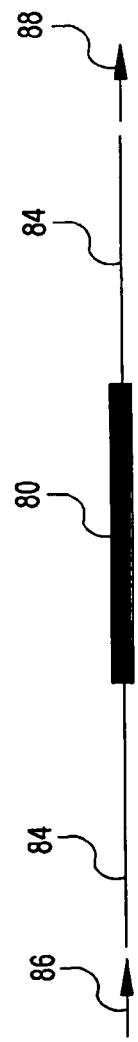

FIG. 20 is a schematic illustration of a further embodiment of the invention that includes spliced end connections for the optical switch.

Figure 21:
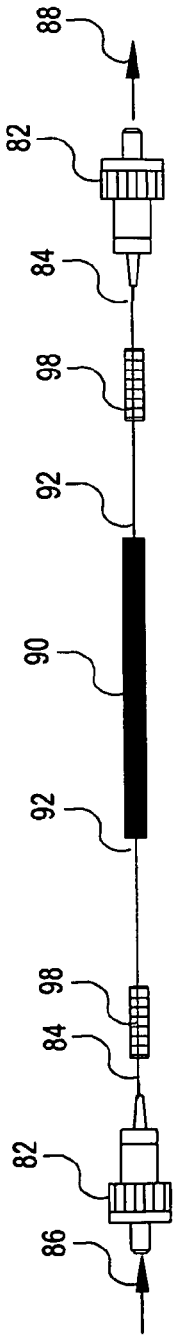

FIG. 21 is a schematic illustration of a further embodiment of the invention that includes PC or APC connectors end connections for an optical switch made of high-numerical-aperture fibers.

Figure 22:
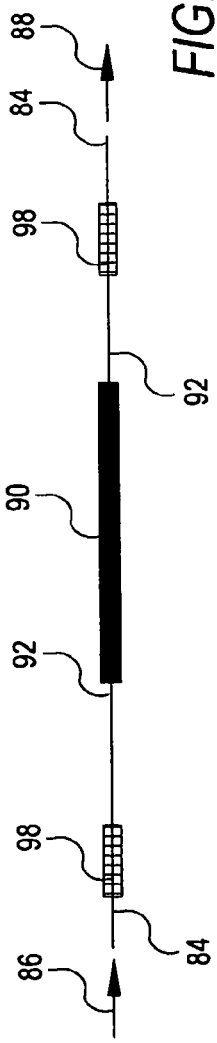

FIG. 22 is a schematic illustration of a further embodiment of the invention that includes SMF-spliced end connections for an optical switch made of high-numerical-aperture fibers.

Figure 23:
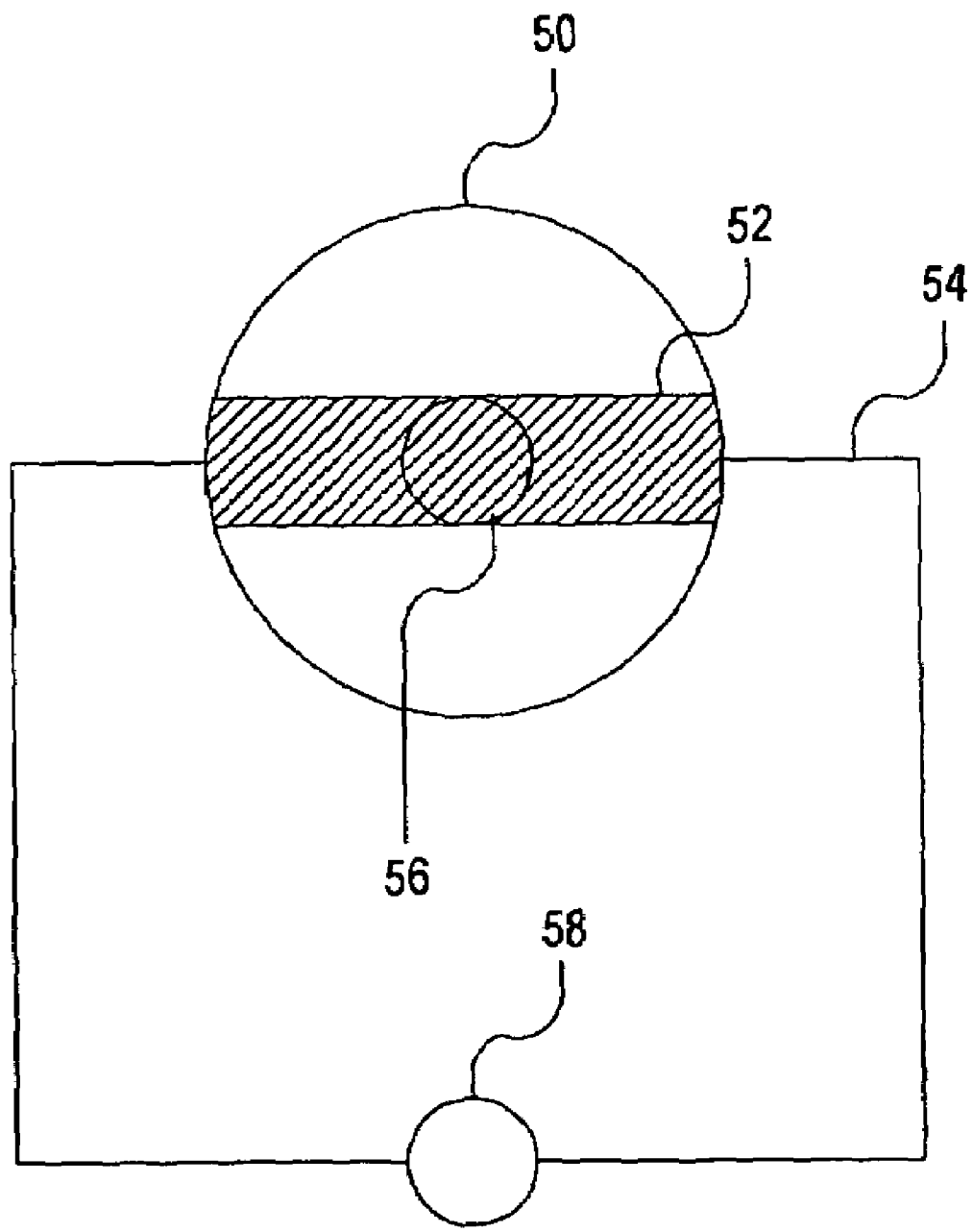

FIG. 23 is a schematic illustration of a further embodiment of the invention that includes an electrical lead interruption at the core area for the detection of switch failure.

Figure 24:
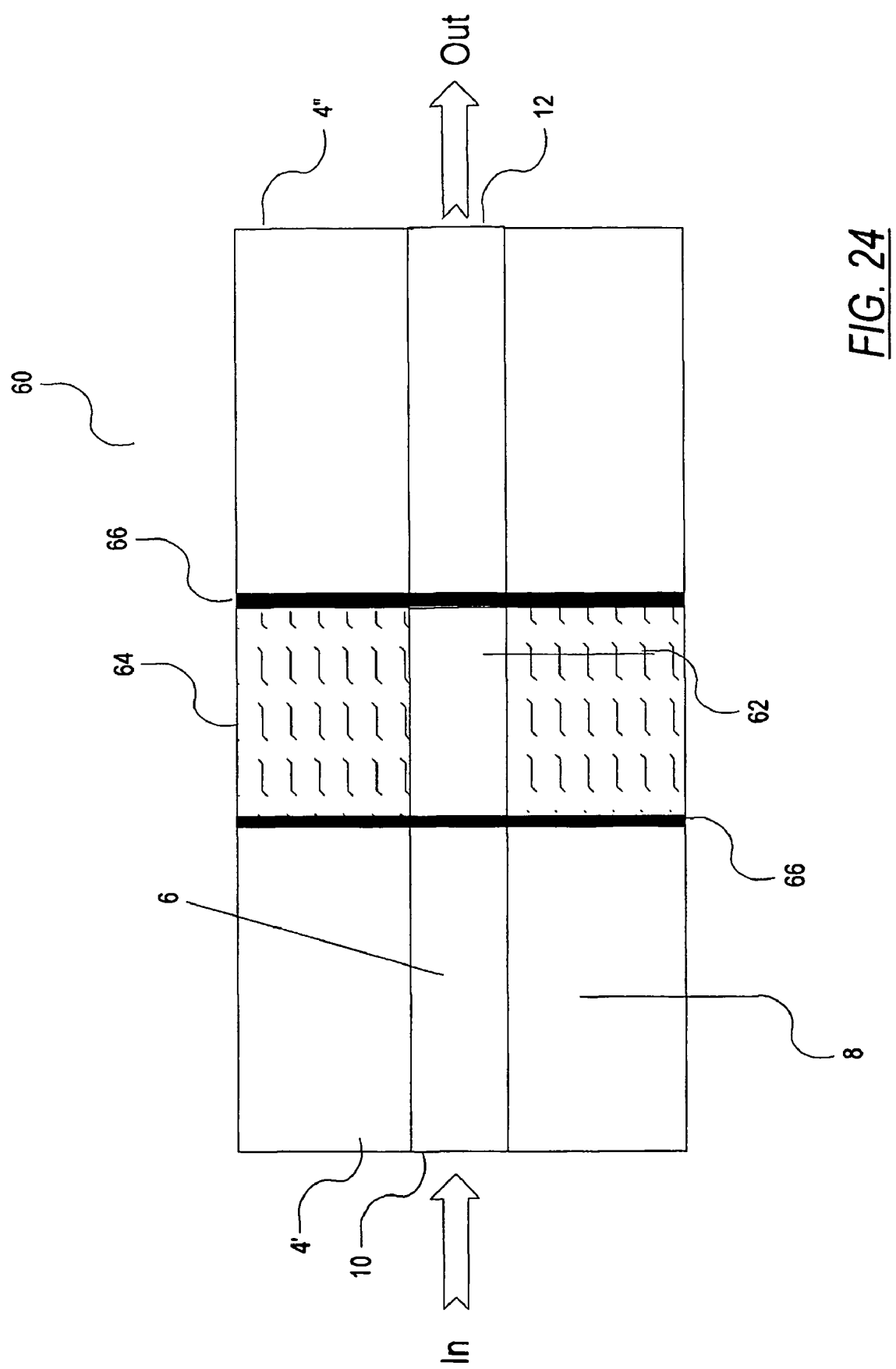

FIG. 24 is a schematic representation of another embodiment of a switching device according to the invention, which consists of an absorbing waveguide.

Figure 25:
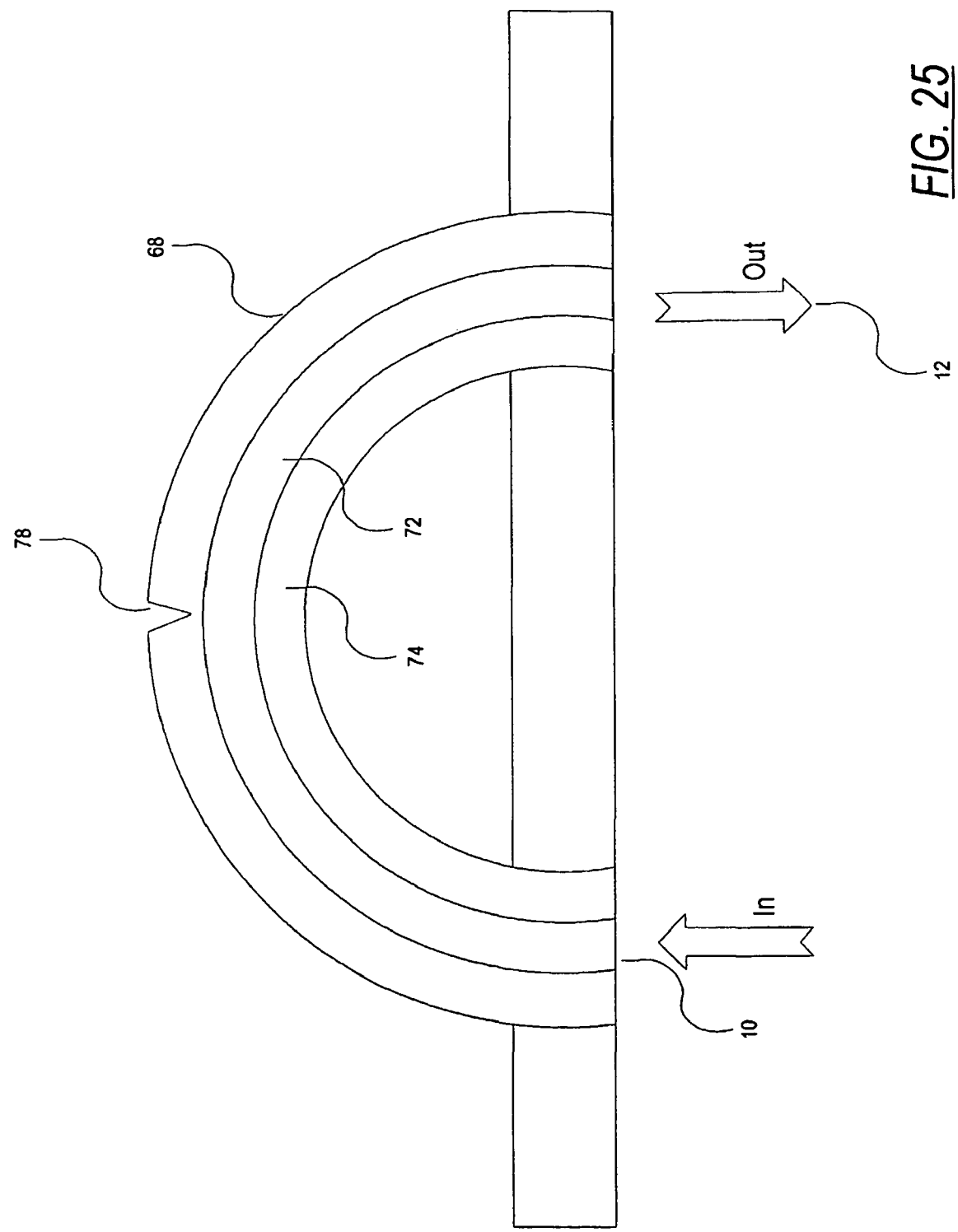

FIG. 25 is a schematic illustration of a switching device having an absorbing waveguide and a notch.

Figure 26:
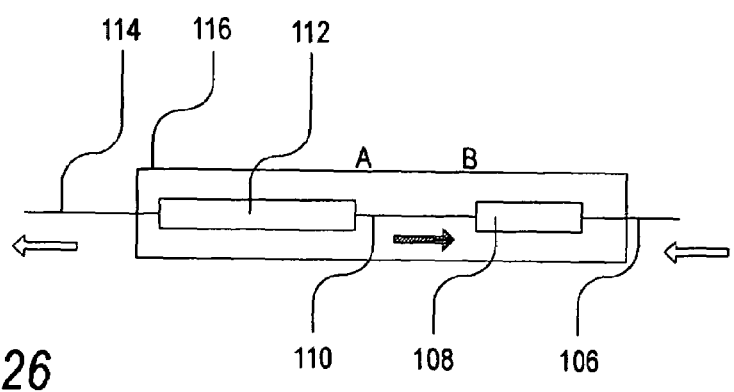

FIG. 26 is a schematic illustration of a protection device against "Fiber Fuse" using a circulator in the device.

Figure 27:
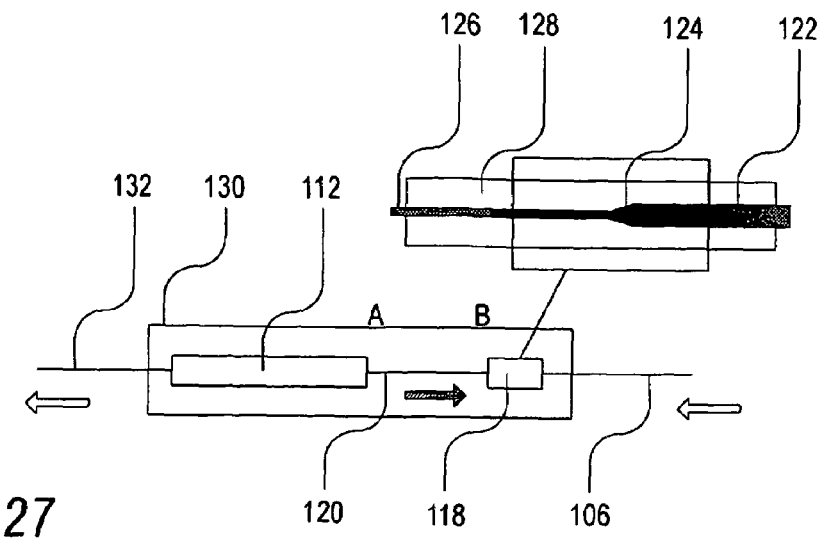

FIG. 27 is a schematic illustration of a protection device against "Fiber Fuse" using a core area reduction in the device.

Figure 28:
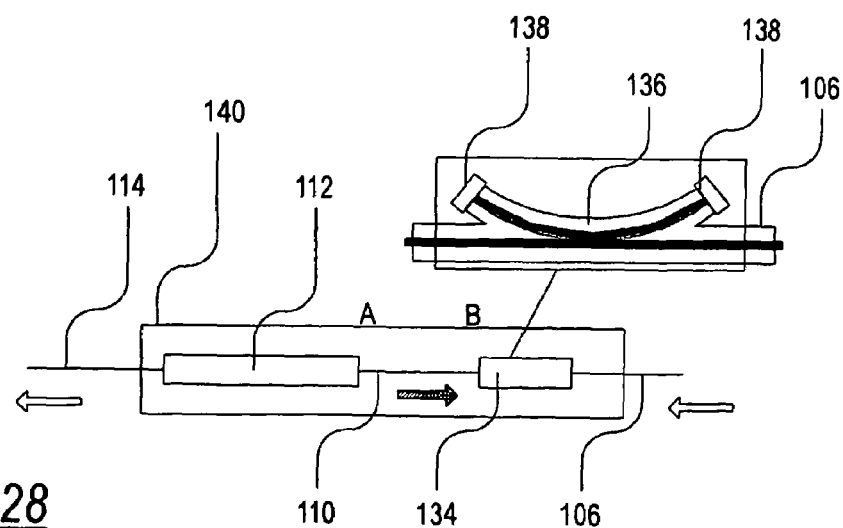

FIG. 28 is a schematic illustration of a protection device against "Fiber Fuse" using a splitter in the device.

DETAILED DESCRIPTION OF PREFERRED EMBODIMENTS

Figure 1:
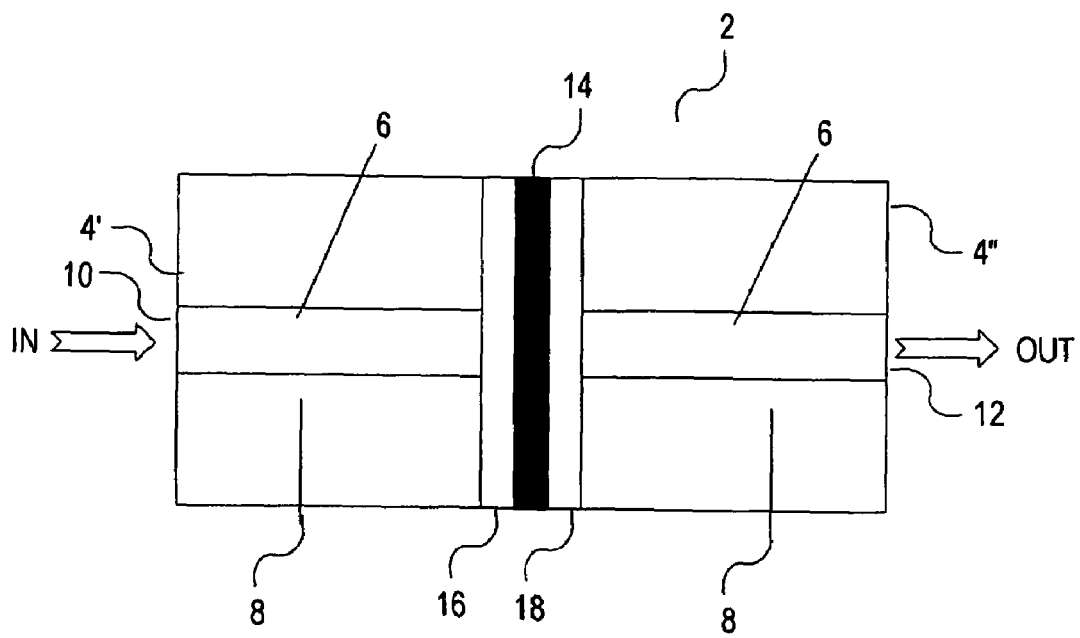

Referring now to FIG. 1, there is shown an optical power or energy switching device 2, composed of an optical waveguide 4, e.g., a solid waveguide or a fiber, cut transversely to form two waveguide sections 4' and 4." The waveguide 4 is composed of a central core 6, in which most of the light propagates, and an outer cladding 8. Also, the waveguide has an input end 10 and an output end 12. Interposed between the two waveguide sections 4' and 4", and transversing the path of optical energy propagating from the input end 10 to the output end 12, is a partially transparent conductive layer 14. The layer 14 is very thin (only a few atomic layers, typically 1 to 20 nanometers) and is made of an electrically conductive material, preferably a conductive metal such as rhodium, aluminum, gold, silver, chromium or nickel, or a combination or alloy of such metals.

Such thin layers of conducting material are known to enhance the electric field strength in their vicinity due to local irregularities of their surface, where the surface irregularities induce field concentration, resulting in lower power needed to create an electrical breakdown, and damage. Such thin nanometric layers may be modeled as a plurality of aggregates of nano-particles (see, e.g., M. Quinten, "Local Fields Close to the Surface of Nanoparticles and Aggregates of Nanoparticles," Appl. Phys. B 73, 245–255 (2001) and the book "Absorption and Scattering of Light by Small Particles" by C. F. Bohren and D. R. Huffmann, Wiley-Interscience (1998), Chapter 12 [showing strong field enhancement factors (up to $10^5$) for few-nanometer particles as well as wide extinction spectra for various materials and shapes].

Additional processes can further enhance the breakdown-like, non-linear self-focusing in fibers and avalanche (see, e.g., N. B. Blombergen, "Laser Induced Electric Breakdown in Solids," IEEE-JQE, Vol. QE-10, No. 3 (1974), pp. 375–386). When the thin layer of conductive material is impinged with optical power exceeding a predetermined threshold, strong electric fields, which can lead to local electrical breakdown, are generated at certain sites ("hot spots") in proximity with the metal surface. This leads to a visible-light-emitting arc discharge, where plasma is created. The generated plasma greatly increases the absorption of the propagating light, and the energetic discharge creates catastrophic damage at or near the metal surfaces. This damage includes cratered regions in the end surfaces of the waveguide sections on opposite sides of the conductive metal layer. Thus, the waveguide permanently becomes highly scattering or, in other words, highly opaque for the propagating light. This significantly reduces the transmitted optical power. Thus, the device acts as a fast switch for interrupting the power propagation, which occurs as fast as the breakdown is created. The switch remains permanently open due to the damage caused by the energetic breakdown.

The switching device offers the following advantages:

1. It is broadband and can be applied to all light bands used in optical communication systems, e.g., at wavelengths of 0.8, 1.3 and 1.5 micrometers.

2. The resulting damage, such as the craters, permanently blocks the channel that received the excessive power.

3. The device's response is very fast, down to the nanosecond region.

4. The visible light, that may be emitted when the damage occurs, can be detected by a monitoring device, to signal when the switch has been exposed to optical power higher than the threshold.

One of the most important properties of the switch is its insertion (or transmission) loss. A low insertion loss at the operating powers is desirable, in order to avoid power losses. However, the conducting layer generally absorbs and reflects light.

As discussed below, the reflection can be minimized by the addition of anti-reflective layers 16 and 18 on both sides of the conducting layer 14. The absorption of the conducting layer, however, is an intrinsic property, which cannot be fully eliminated (it absorbs between 3% and 30% of the power). Therefore, the insertion loss at the operating power is not negligible, and may reach approximately 1 dB and or even higher. As opposed to the desirable low insertion loss at the operating powers (below threshold), the switch is required to have a high insertion loss (low transmission) at high powers (above the threshold). This is obtained by the significant and permanent damage to the surfaces adjacent the conducting layer 14, which significantly increases the loss (reduces the transmission). Typical values of insertion loss after damage occurs are in the range of 10 to 20 dB (namely, leaving only 1%–10% transmission).

In order to control the threshold power at which the switch opens, several methods can be used. First, the thickness of the conductive layer 14 may be varied to adjust the threshold. In general, the threshold power decreases with increasing thickness of the conductive layer. However, the insertion loss at the operating power also changes with thickness, (the thicker the layer, the higher the loss). Thus, the use of thickness to adjust the threshold is useful only over a limited range of operating powers. Second, the threshold may be adjusted by using fibers of different core 6, or mode field diameters. The commonly used fiber in optical communication systems is the SMF-28 single-mode fiber. This fiber has a mode field diameter of approximately 10 micrometers for 1550 nm wavelengths. Other fibers have either smaller or larger diameters. For example, High-Numerical-Aperture (HNA) fibers generally have smaller mode field diameters down to 4 micrometers. Thus, in HNA fibers, the light intensity (power per unit area) is larger than in SMF-28 fibers operating with the same power. Consequently, the power threshold in HNA fibers is lower than that in SMF-28 fibers with the same general structure 2. Since there are several possible HNA fibers, with different mode field diameters, one can control the threshold power using different types of optical fibers. Moreover, the input and output fibers can still be standard SMF-28 fibers. These can be efficiently fusion-spliced to the HNA fibers or other types of fibers (insertion losses are approximately 0.1 dB per splice). Thus, using different types of fibers, having different mode field diameters, with the same structure 2 can lead to switches having different thresholds and nearly the same insertion loss at the operating powers. The same principle is used for multi-mode fibers having various mode field diameters. Another way of threshold variation is to select a dielectric layer that will decrease the power breakdown level, e.g., a polymeric adhesive layer.

Figure 2:
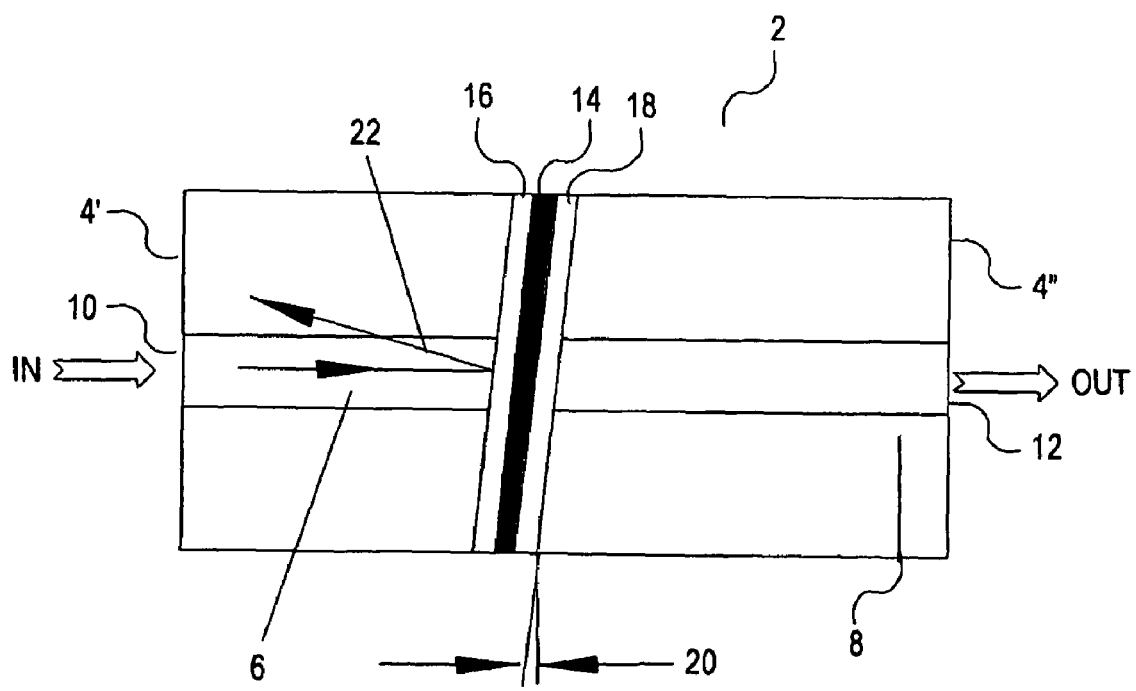

As with most optical fiber components, minimal back reflection is desirable in the switching device of this invention. This minimal back reflection may be obtained by a combination of two methods. First, the conductive layer 14 can be deposited on a surface that extends across the optical waveguide at an angle, i.e., not perpendicular to the direction of propagation of the light, thus preventing any back reflection from re-entering the waveguide core, as depicted in FIG. 2 (as discussed below). The conductive layer may be either a single layer or a layer that is covered on one or on both sides with transparent layers, which can serve as anti-reflective coatings, reducing the optical reflections. The coating layers 16 and 18 are designed to have minimal reflections. The anti-reflective layers 16 and 18 can be composed of the same dielectric material, or of two different materials. Generally, when using the same material, in order to obtain minimal reflection, the thickness of the layers 16 and 18 is unequal; the difference in thickness of the entry layer 16 and the exit layer 18 is due to a phase change of reflections from conducting surfaces as opposed to no phase change of reflections from dielectric material like the silica of the fiber. The coating is then an asymmetric coating, and has a pre-designated input direction, (the device's properties are different in the backward direction). Each of the anti-reflective coatings 16, 18 preferably has a thickness within the range from about 0.1 to about 1.5 micrometer.

For certain applications, only one of the two anti-reflective coatings 16 and 18 may be desired.

FIG. 2 illustrates a device similar to that shown in FIG. 1. However, here the layers 14, 16 and 18 are not perpendicular to the direction of light propagation in the waveguide, but rather at an angle 20. For example, in single-mode optical fibers, e.g., SMF 28, the angle 20 is typically 8 degrees. Thus, an optical reflection 22 from the layer 14 does not propagate backwards inside the waveguide.

FIG. 3 illustrates the switch of FIG. 1 packaged in a connector-like configuration. The device can be packaged in several ways. First, using optical fiber connectors 34, the device is similar (at least when viewed externally) to two pigtailed fibers, which are connected using connectors 34. Such a device includes an input fiber; two connectors 34 connected using an adapter 35, an aligning sleeve 32, and input and output fibers. However, the difference between the switching device and the standard connector is that either one or both fibers have additional layers 14, 16, 18 on their matching surfaces.

In the illustrated example, two commercially available PC (Physical Contact) connectors 34 (e.g., HPC-SO.66 connector manufactured by Diamond SA, Switzerland), with their respective integral ferrules 30, are assembled to connect the input waveguide section 4' with the output waveguide section 4". The two waveguide sections 4' and 4" are registered with each other by the adapter 35 having an aligning sleeve 32 that fits over both ferrules 30 and aligns them with each other. The conducting layer 14 and, if needed, the anti-reflective layers 16 and 18, are deposited on one or both ferrules 30 to perform the switching operation described above.

FIG. 4 illustrates the switch of FIG. 2 packaged in a connector-like configuration. Here, two commercially available APC (Angled Physical Contact) connectors 34 (e.g., HPC-S8.66 connector manufactured by Diamond SA, Switzerland) are assembled to connect the input waveguide portion 4' with the output waveguide portion 4", again using an adapter 35 having an aligning sleeve 32 to register the two waveguide portions 4' and 4". Here, the conducting layer 14 and, if needed, the anti-reflective layers 16 and 18, are deposited on one or both angled ferrules 38 (an integral part of connectors 34) to perform the switching operation. This 8-degree angled arrangement prevents reflections from entering the core areas of the waveguide portions 4' and 4".

Figure 5:
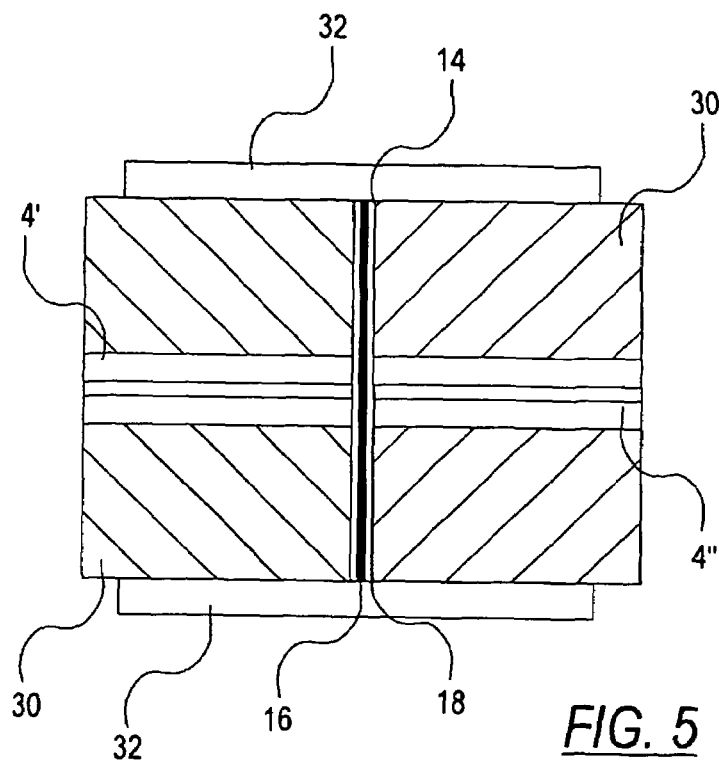

FIG. 5 describes a ferrule switch inner assembly. Here, two PC ferrules 30 are assembled together, aligned by an aligning sleeve 32, to connect the input waveguide portion 4' with the output waveguide portion 4". The conducting layer 14 and, if needed, the anti-reflective layers 16 and 18, are deposited on one or both ferrules 30 to perform the switching operation. Ferrules 30 with fibers are made of, e.g., zirconia, and can be purchased commercially as well as aligning sleeve 32, and are available in 1.5 and 2.5 mm diameters. The inner assembly is held together, e.g., using an external, spring-loaded casing holding them axially in contact.

Figure 6:
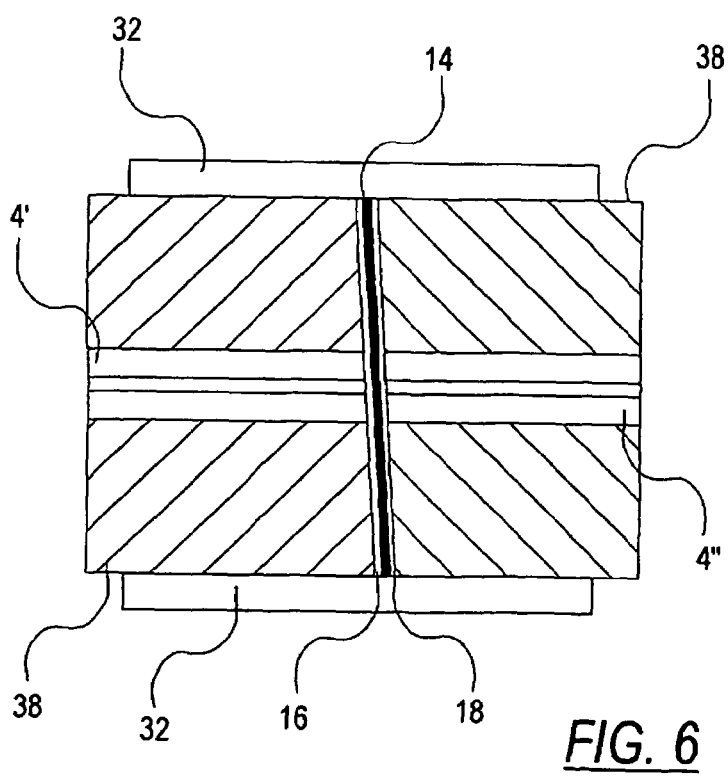

FIG. 6 illustrates a ferrule switch inner assembly having an angled configuration. Here, two APC (angled) ferrules 38 are assembled, aligned by an aligning sleeve 32, to connect the input fiber 4' with the output fiber 4". The conducting layer 14 and, if needed, additional anti-reflective layers 16 and 18, are deposited at an angle on one or both ferrules 38 to perform the switching operation. Here again, the angled arrangement prevents reflections from entering the fiber core area. Ferrules 38 with fibers are made of, e.g., zirconia, and can be purchased commercially as well as aligning sleeve 32, and are available in 1.5 and 2.5 mm diameters. The inner assembly is held together, e.g., using an external, spring-loaded casing holding them axially in contact.

Figure 7:
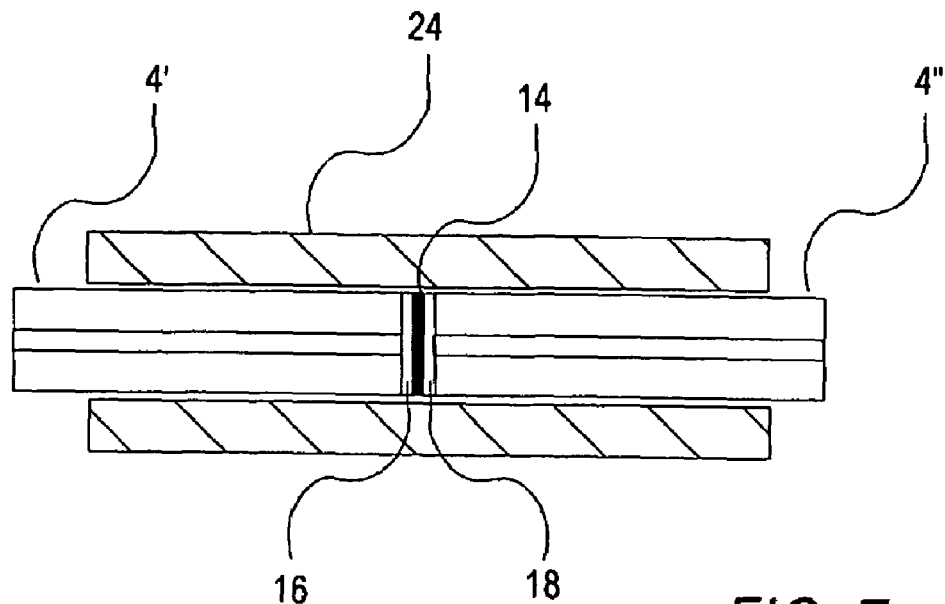

FIG. 7 illustrates a bare fiber switch assembly. It consists of two bare fiber (e.g. SMF 28 of 125 micrometers diameter) lengths 4' and 4", cleaved perpendicularly. The two fiber lengths 4' and 4" are aligned and assembled, using an aligning tube or capillary 24. Here, the conducting layer 14 and, if needed, the anti-reflective layers 16 and 18, are deposited on one or both of the opposed end surfaces of the input fiber 4' and the output fiber 4". The assembly is fixed in position using, e.g., a commercially available mechanical envelope such as the "ultra splice" made by the Siemon Company, USA, or a commercially available silicon V-groove made by Orgil Optical Connector, Tel-Aviv, Israel.

Figure 8:
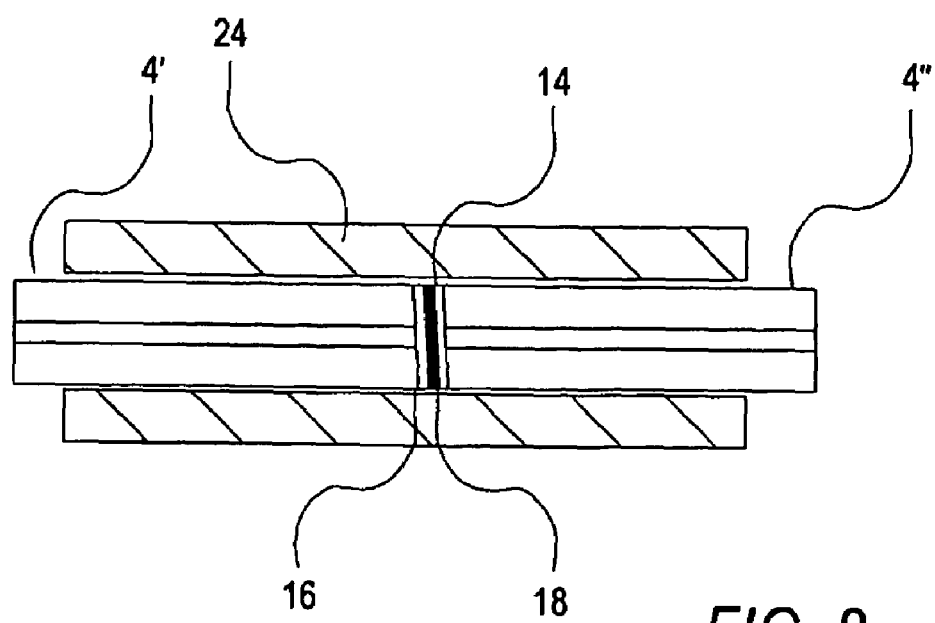

FIG. 8 illustrates a bare fiber switch assembly having an angled configuration. Here, two angle-cleaved fibers 4' and 4" are aligned and assembled using an aligning tube or capillary 24, taking care of both linear as well as angular alignment. The conducting layer 14 and, if needed, additional anti-reflective layers 16 and 18, are deposited on one or both of the input fiber 4' and output fiber 4", on the angled end surfaces. This angled arrangement prevents reflections from entering the core area. The assembly is fixed in position using, e.g., a commercially available mechanical envelope such as the "ultra splice" made by the Siemon Company, USA, or a commercially available silicon V-groove made by Orgil Optical Connector, Tel-Aviv, Israel.

FIG. 9 illustrates a thin conducting layer 14 that is the only layer between the two waveguides (or fibers) 6 and performs the switching operation. Also, the layer 14 can be deposited either perpendicular to or at an angle to the light-propagation direction as shown in the drawing. In this case fusion splicing holds the assembly together. After splicing, the splice is re-coated or covered by a commercially available shrinkable polymer sleeve.

FIG. 10 illustrates a thin conducting layer 14 placed between two anti-reflection layers 16 (at entrance) and 18 (at exit). Here, all three layers are placed between the two waveguides (or fibers) and perform the switching operation. Here again, the layers 14, 16 and 18 can be deposited either perpendicular to or at an angle to the light-propagation direction as shown in the drawing. In this case fusion splicing holds the assembly together. After splicing, the splice is re-coated or covered by a commercially available shrinkable polymer sleeve.

Figure 11:
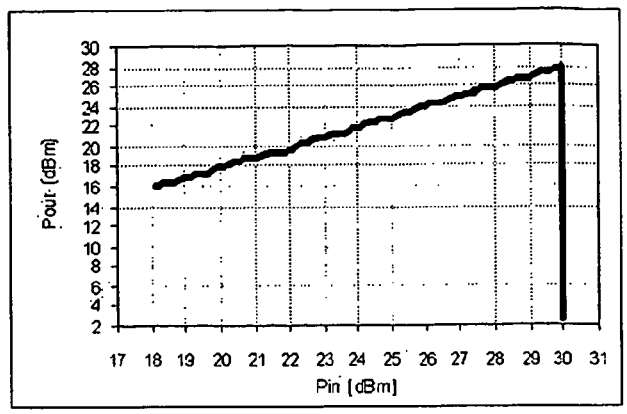

FIG. 11 is an experimental curve of the output power versus the input power in one example of the switch. In the example presented here, the thin layer was made of chromium (Cr). Two non-symmetric, anti-reflective layers on both sides of the Cr layer served as anti-reflecting layers. These layers were positioned at the interface between two silica SMF 28 fibers and tested. The experimental results showed a power threshold of approximately 30 dBm (1 Watt), where the output power just before damage occurred was approximately 28 dBm. Also, the output power dropped by approximately 25 dB when the damage occurred, reducing the output power to approximately 0.3% of its original power when the threshold power level was exceeded.

FIG. 12 presents another experimental curve of the output power versus the input power in one of the switches. In the example presented here, the thin layer was made of chromium (Cr). Two non-symmetric, anti-reflective layers on both sides of the Cr layer served as anti-reflecting layers. These layers were positioned at the interface between two silica HNA fibers and tested. Here, the experimental results showed a power threshold of approximately 24 dBm (250 mW), where the output power just before damage occurred was approximately 23 dBm. Also, the output power dropped by approximately 20 dB when the damage occurred, reducing the output power to approximately 1% of its original power when threshold power was exceeded.

FIG. 13 presents an experimental curve of output power versus time for the switch described in FIG. 12, above, (power is given here in relative units). One can clearly see that the power transmitted through the switch increased while the input power increased until the threshold power level was reached. At this point the switch became opaque, and the power out dropped at times in the microseconds range. The switch stays opaque for powers above the threshold.

FIG. 14 is an experimental microscopic view of a damaged (opaque) switch. At the instant when the damage occurs, and the output energy drops, visible light is emitted in all directions from the core at the damaged spot. This is mainly due to recombination of ions and electrons in the ionized volume of the core close to the coatings where the crater or craters are developed. Visual (microscopic) inspection after the damage revealed a cratered core, with craters a few microns deep covering substantially all the cross-sectional areas of the core (where the optical power flows). One can see that the crater has similar dimensions to the core, and the large cladding area is not cratered. The outer diameter of the cladding is 125 micrometers, and the core diameter is approximately 10 micrometers, covering about 1% of the total cross-sectional area of the optical waveguide.

FIG. 15 is a schematic illustration of a further embodiment of the invention that includes a light detector, such as a photodiode, for detecting discharge-emitted light for switch failure detection.

On-line testing and status reporting of switches is a part of the system status design in many systems. There are several methods for status monitoring of the switches described above. First, the input power and output power may be measured, using splitters and power detectors, and used to control the insertion loss parameter. When the insertion loss grows to a pre-determined level, the switch is declared opaque, and is replaced after correcting the malfunctioning channel. This method requires two detectors and a control loop and is relatively expensive. Second, a visible light burst produced by the switch may be detected, using a photo detector, e.g., a commercially available photodiode. After the burst occurrence, the switch is declared opaque. This is depicted in FIG. 15.

When the switch becomes opaque, light is emitted in all directions from the vicinity of the center of the layer 14 (where the incoming light in the core 6 impinges on layer 14). The light emitted in direction 46 traverses the cladding 8 and passes into the light detector 44, e.g., a photodiode. When the detector 44 emits a pulsed signal in response to the light burst from the plasma (and later the scattered light from layer 14 after the damage), that signal indicates that the switch has been exposed to power higher than the threshold power level and should be replaced after correcting the malfunctioning channel. Two other status-monitoring techniques are illustrated in FIGS. 18 and 23, described below.

FIG. 16 is a schematic illustration of an embodiment that includes multiple switches. The small dimensions of the switch enable the construction of multiple switches in clusters for use on a plurality of optical fibers or waveguides. In this way one can include spares or replacements in the cluster and replace them remotely. Here multiple (e.g., three) switches 68 are manufactured in a stack 60 of a multiplicity of silica waveguides 66 manufactured on a common substrate (the manufacturing of silica waveguides on silicon substrates is a well established process and offered by many manufacturers, e.g. Lambda-Crossing, Caesarea, Israel, with each waveguide having input light 62 and output light 64. The conducting layer that forms the switches 68 are located between the input and the output and deposited there as a single or three-layer switch. These switches 68 may serve as operating switches and/or spares to replace a switch that becomes opaque when subjected to excessive power.

FIG. 17 is a schematic illustration of an embodiment that consists of plurality of switches 70 in a stack 72 of separate fibers, each having input power 62 and output power 64. The sacrificial coatings that form the switches 70 serve for a plurality of leads as well as having spares in the proximity for quick change. The input fibers 62 and output fibers 64 may be a commercially available fiber ribbon having multiple fibers in the ribbon, or in spliced configuration, places into plurality of V-grooves on a single wafer.

FIG. 18 is a schematic illustration of an embodiment that detects the return (back-reflected) power, which generally changes after the switch turns opaque. The back-reflected light 48 propagates in the core 6 of the input fiber length 4', in a direction opposite that of the input light, and is split by an optical splitter 49 such as a commercially available fiber coupler, a beam splitter, a circulator or other device. The splitter 49 directs a portion of the back-reflected light toward an optical detector 44. Since the back-reflected light 48 changes significantly when the switch 2 becomes opaque, the switching can be detected by the detector 44.

FIG. 19 is a schematic illustration of an embodiment that includes different end (external) connections for the optical switch assembly. This applies to all the switches described in this patent application and illustrates only the connection to the external world (not the switch itself). Here, the switch 80 is connected through an optical fiber 84 (e.g., SMF) to input and output connectors 82 and 83. The input light 86 is supplied to the fiber 84 through the connector 82, whereas the output light 88 is removed from the fiber through the other connector 82. This configuration is preferred for easy manual replacement.

FIG. 20 shows the external connections as a splice-ready assembly where both the input and output fibers 84 (e.g., SMF) are left for future splicing. This applies to all the switches described in this patent application and illustrates only the connection to the external world (not the switch itself).

FIG. 21 shows a switch 90 based on a High Numerical Aperture (HNA) fiber. Here, the input ray 86 is connected through a connector 82 to a standard fiber 84 (e.g., SMF), then through a fiber splice 98 to a HNA fiber 92, which is also used in the switch 90. After passing through the switch 90, the light propagates through a HNA fiber 92 to another fiber splice 98 into a standard fiber 84, and then to an output connector 82, from which the output ray 88 is emitted. This applies to all the switches described in this patent application and describes only the connection to the external world (not the switch itself). This configuration is preferred for easy manual replacement.

FIG. 22 shows a similar switch 90, based on an HNA fiber, in a splice-ready configuration. This configuration is similar to that shown in FIG. 21, has no external connectors, but with splice-ready standard (e.g., SMF) fibers. Here both the input ray 86 and the output ray 88 are connected using splices to standard (e.g., SMF) fibers 84. This applies to all the switches described in this patent application and illustrates only the connection to the external world (not the switch itself).

FIG. 23 is a schematic illustration of a direct electrical method for status monitoring. Here a thin sacrificial conductive layer 52 is deposited as a conductive strip having a width similar to that of the optical fiber core 56. This layer is deposited across the waveguide or the optical fiber 50, passing through the fiber core. When optical power exceeding the threshold power is transmitted through the core, the layer 52 is interrupted at the core area 56, leading to an open circuit or significant increase in the electrical resistance of the layer 52 if it is only partially destroyed. This open circuit or increase in resistance can be detected and thus serves as a signal of high power, exceeding the threshold. The conductive layer 52 may be a metallic sacrificial layer that is deposited in a rectangular shape in the center of the fiber 50 and having a width about the same as the core dimension, e.g., approximately 10 micrometers for a single mode fiber. This layer 52 is interrupted in the core area 56 when exposed to optical powers higher than the threshold power, and this interruption is detected by a circuit 54 having a continuity or resistance detector 58. The interruption means an opaque switch.

FIG. 24 is a schematic representation of another embodiment of a switching device according to the invention, which consists of an absorbing waveguide. There is shown an optical power or energy switching device 60, composed of a waveguide 4, e.g., a solid waveguide or a fiber, having an input end 10 and an output end 12. Interposed between the two portions 4', 4" of the waveguide 4 and transversing the propagation path of optical energy from input end 10 to output end 12, there is affixed an optical energy-absorbing fiber or waveguide 30. The core 62 of the fiber 64 may be made of polymer or of doped glasses or of any other partially absorbing material. The fiber or waveguide may be covered, on one or on both sides, with an index-matching layer 66. When the fiber 64 is impinged by optical energy exceeding a predetermined threshold, the fiber 66 is damaged, e.g., melts, shrinks or breaks, and therefore significantly reduces the transmitted optical energy, thus acting as a switch for interrupting energy propagation.

FIG. 25 is a schematic illustration of a switching device 68 having an absorbing waveguide 70 and a notch. The switching device 68 is composed of an optical waveguide 70 having a core 72 and cladding 74. The waveguide 70 can be composed, for example, of doped silica or polymers. The waveguide has an input end 10 and output end 12, and is pre-stressed, e.g., by bending it into any desired configuration. At or adjacent to the region of maximum stress, the cladding 74 is weakened, e.g., by a groove or notch 78. When optical energy is introduced into the fiber, the core heats up. When the optical energy propagating through the fiber exceeds a predetermined limit, the core 72 and cladding 74 break at or near the notch 78. Such breakage separates the input core portion from the output core portion, thus preventing the optical energy from propagating to the output end 12.

FIG. 26 describes a switch assembly 116 that is able to protect a device or detector at high threshold powers. A typical phenomenon occurring in fibers carrying high powers (about of $3 \times 10^6$ watts/cm$^2$ in the core) is the "Fiber Fuse" effect where due to the interaction of the high power incoming light with the back reflected light from a perturbation in the fiber, the fiber is disrupted, starting from the perturbation and extending back into the input source. The fiber is useless, catastrophically damaged, after a "Fiber Fuse" has passed through it. This phenomenon is responsible for destruction of high power fibers, and it is prevented by the switch assembly 116. Optical power comes in through fiber 106, e.g., a silica single mode fiber, into an optical isolator 108 (a one-way optical switch, commercially available). After leaving the optical isolator 108 through fiber 110, the light impinges on a safety switch 112. During normal operation the switch 112 will perform as follows: In the case that the power is lower than the threshold power of the switch 112, the light continues into the fiber 114 uninterrupted. In the case that the power is above the threshold, the switch 112 turns opaque and scattering, thus preventing the light from proceeding onto the fiber 114. In the cases where the power is high enough to enable the "Fiber Fuse" to occur, the switch 112 is designed to have a power threshold just below the "Fiber Fuse" minimal power, and will turn opaque and scattering under the "Fiber Fuse" power, saving fiber 114 from damage. In the cases that "Fiber Fuse" starts at point A on fiber 110 and proceeds in the direction of the black arrow toward point B, where it is stopped by the isolator 108, saving the fiber 106 from damage. The entire switch assembly 116 is replaced after the event, but the transmission fiber 114 as well as the source through fiber 106 are safe. The safety switch 112 may be any known safety switch, including those described herein.

FIG. 27 illustrates an alternative way to protect against a "Fiber Fuse." Here the optical power enters the system through a fiber 106 (e.g., single-mode fiber SMF28 having a core or a MFD-Mode Field Diameter of about 10 µm) into a core diameter reduction box 118, shown enlarged in the figure, where the fiber 106 having a core 122 is spliced to a fiber 120 having core 128. The core 128 is smaller than the core 122 (e.g., HNA fiber having a core or MGD of about 5 µm), and the splice contains a conical transition 124 connecting the large and the small cores. The light leaves the core diameter reduction box 118 via fiber 120, which has a small core diameter, entering the safety switch 112. During normal operation the switch 112 performs as follows: In the case that the power is lower than the threshold power of the switch 112, the light continues into the fiber 132 unperturbed. In the case that the power is above the threshold, the switch 112 turns opaque and scattering, thus preventing the light from proceeding onto the fiber 132. In the cases where the power is high enough to enable the "Fiber Fuse" to occur, the switch 112 is designed to have a power threshold just below the "Fiber Fuse" minimal power, and turns opaque and scattering just below the "Fiber Fuse" power, saving the fiber 132 from damage. In the cases that "Fiber Fuse" starts, at point A on fiber 120 and proceeds in the direction of the black arrow toward point B, it is stopped at the point 124 where the core gets larger, the power per cm$^2$ gets lower and the fiber fuse cannot proceed further, thus saving the fiber 106 from damage. The entire switch assembly 130 is replaced after the event, but the transmission fiber 132 as well as the source through fiber 106 are safe. The safety switch 112 may be any known safety switch, including those described herein.

FIG. 28 illustrates another way to protect against a "Fiber Fuse". Here the light power enters the system through a fiber 106 (e.g., single-mode fiber SMF 28 having a core or a MFD of about 10 □m) into a splitter or coupler box 134. The splitter box 134 contains the entrance fiber 106, connected at a core-to-core, through the clad, splice to a fiber 136, as shown in the drawing. The light impinging through fiber 106 on the splitter made of fiber 106 and fiber 136, leaves the splitter at lower power because part of the power (e.g., 1–10%) is channeled to the fiber 136 and absorbed in a beam dump or terminator 138. After leaving the splitter box 134 through the fiber 110, the light impinges on the safety switch 112. During normal operation the switch 112 performs as follows: In the case that the power is lower than the threshold power of the switch 112, the light continues into the fiber 114 uninterrupted. In the case that the power is above the threshold, the switch 112 turns opaque and scattering thus preventing the light from proceeding onto the fiber 114. In the cases where the power is high enough to enable the "Fiber Fuse" to occur, the switch 112 is designated to have a power threshold just below the "Fiber Fuse" minimal power, and turns opaque and scattering just under the fiber fuse power, saving the fiber 114 from damage. In the cases that "Fiber Fuse" starts at point A on the fiber 110 and proceeds in the direction of the black arrow toward point B, it is stopped by the splitter box 134, where the core gets larger due to the added area of the splitting fiber 136 and some power goes into the beam dump 138 and is absorbed there, the power per cm$^2$ gets lower at the splitting point and the fiber fuse cannot proceed further, thus saving the fiber 106 from damage. The entire switch assembly 140 is replaced after the event, but the transmission fiber 114 as well as the source through fiber 106 are safe. The safety switch 112 may be any known safety switch, including those described herein.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes, which come within the meaning and range of equivalency of the claims, are therefore intended to be embraced therein.

What is claimed is:

1. An optical power or energy-switching device, comprising:
    an optical waveguide having an input section and an output section, the two sections forming a pair of opposed surfaces extending transversely through the axes of said waveguide sections, and
    a thin, substantially transparent layer of electrically conductive material disposed between said opposed surfaces, said layer of conductive material comprising aggregates of nano-particles of said electrically conductive material that form a plasma when exposed to optical signals propagating within said optical waveguide with an optical power level above a predetermined threshold, said plasma damaging said opposed surfaces sufficiently to render said surfaces substantially opaque to light propagating within said optical waveguide so as to prevent the transmission of such light.

2. The optical power or energy-switching device of claim 1, which includes a thin, substantially transparent coating of an anti-reflective material on at least one surface of said conductive layer.

3. The optical power or energy-switching device of claim 1, which includes a thin, substantially transparent coating of an anti-reflective material on both surfaces of said conductive layer.

4. The optical power or energy-switching device of claim 1, wherein said electrically conductive material is at least one material selected from the group consisting of the metals rhodium, aluminum, gold, silver, chromium, nickel and alloys of at least two of said metals.

5. The optical power or energy-switching device of claim 1, wherein said electrically conductive material comprises at least two layers of at least one material selected from the group consisting of the metals rhodium, aluminum, gold, silver, chromium, nickel and alloys of at least two of said metals, said layers being stacked one on top of the other.

6. The optical power energy-switching device of claim 1, which includes a detector receiving light emitted by said plasma to detect the status of the energy-switching device.

7. The optical energy-switching device of claim 1, wherein said waveguide is an optical fiber.

8. The optical energy-switching device of claim 1, which includes a pair of connectors each of which is attached to one of said input and output waveguide sections, each connector including a ferrule receiving a portion of said input or output waveguide section, and an aligning sleeve surrounding said ferrules for aligning said opposed surfaces with each other.

9. The optical energy-switching device of claim 1, wherein said input and output waveguide sections are attached to each other by a mechanical splicing section that includes an aligning sleeve or capillary surrounding said waveguide sections for aligning said opposed surfaces with each other.

10. The optical energy-switching device of claim 1, wherein said input and output waveguide sections are attached to each other by fusion splicing.

11. The optical energy-switching device of claim 1, wherein said waveguide is at least one fiber made of polymer.

12. The optical energy-switching device of claim 1, wherein said waveguide is at least one fiber made of an absorbing material.

13. The optical power or energy-switching device of claim 1, wherein said opposed surfaces are not perpendicular to said optical path of said waveguide so as to prevent back reflections.

14. The optical energy-switching device of claim 1, further comprising means for detecting the status of the switching device by detecting the continuity of a thin metallic film across a core of said waveguide after exposure to over-threshold powers.

15. The optical energy-switching device of claim 1, which includes connectors attached to said input and output sections of said waveguide.

16. The optical energy-switching device of claim 1, further comprising a dectector receiving back-reflected light from said opposed surfaces after exposure to over-threshold powers for detecting the status of the switching device.

17. The optical energy-switching device of claim 1, wherein said waveguide sections are connected via fibers prepared for fusion splicing.

18. The optical energy-switching device of claim 1, wherein said switching device is made using HNA fibers fusion spliced to SMF fibers for connecting said HNA fibers to an external input and an external output.

19. The optical energy-switching device of claim 1, which includes a circulator for use as a "Fiber Fuse" protection device.

20. The optical energy-switching device of claim 1, which includes a core reduction area for use as a "Fiber Fuse" protection device.

21. The optical energy-switching device of claim 1, which includes a splitter for use as a "Fiber Fuse" protection device.

22. An optical power or energy-switching device, comprising:
    an optical waveguide having an input section and an output section, the two sections forming a pair of opposed surfaces extending transversely through the axes of said waveguide sections, and
    a thin, substantially transparent layer of electrically conductive material disposed between said opposed surfaces, said layer of conductive material comprising aggregates of nano-particles of said electrically conductive material that undergo a catastrophic breakdown when exposed to optical signals propagating within said optical waveguide with an optical power level above a predetermined threshold, said catastrophic breakdown damaging said opposed surfaces sufficiently to render said surfaces substantially opaque to light propagating within said optical waveguide so as to prevent the transmission of such light.

23. A method of preventing the transmission of light within an optical waveguide when optical signals are propagated through the waveguide with an optical power level above a predetermined threshold, the method comprising
    providing an optical waveguide having an input section and an output section, the two sections forming pair of opposed surfaces extending transversely through the axes of said waveguide sections with a thin, substantially transparent layer of electrically conductive material extending transversely across the axis of said waveguide, said layer of conductive material comprising aggregates of nano-particles of said electrically conductive material, forming a plasma between said opposed surfaces when said aggregates of nano-particles of said electrically conductive material are exposed to optical signals having a power level above said predetermined threshold, said plasma damaging said waveguide sufficiently to render said waveguide substantially opaque to light propagating within said waveguide so as to substantially prevent the transmission of such light.

24. The method of claim 23, which includes a thin, substantially transparent coating of an anti-reflective material on at least one surface of said conductive layer.

25. The method of claim 23, which includes a thin, substantially transparent coating of an anti-reflective material on both surfaces of said conductive layer.

26. The method of claim 23, wherein said electrically conductive material is at least one material selected from the group consisting of the metals rhodium, aluminum, gold, silver, chromium, nickel and alloys of at least two of said metals.

27. The method of claim 23, wherein said electrically conductive material comprises at least two layers of at least one material selected from the group consisting of the metals rhodium, aluminum, gold, silver, chromium, nickel and alloys of at least two of said metals, said layers being stacked one on top of the other.

28. The method of claim 23, which includes detecting the status of the energy-switching device by detecting the light emitted by said plasma.

29. The method of claim 23, wherein said waveguide is an optical fiber.

30. The method of claim 23, further comprising:
providing a pair of connectors having ferrules receiving portions of said waveguide; and
aligning the portions of said waveguide received in said ferrules using an aligning sleeve surrounding said ferrules.

31. The method of claim 23, wherein said input and output sections of said waveguide are attached to each other by a mechanical splicing section, and aligning opposed ends of said waveguide sections with an aligning sleeve V-groove or capillary surrounding said waveguide sections.

32. The method of claim 23, wherein input and output sections of said waveguide are attached to each other by fusion splicing.

33. The method of claim 23, wherein said waveguide is at least one fiber made of polymer.

34. The method of claim 23, wherein said waveguide is at least one fiber made of an absorbing material.

35. The method of claim 23, wherein said layer of electrically conductive material is not perpendicular to the optical path of said waveguide for preventing back reflections.

36. The method of claim 23, further comprising detecting the status of the switching device by detecting the continuity of a thin metallic film across a core of said waveguide after exposure to over-threshold powers.

37. The method of claim 23, further comprising means for detecting the status of the switching device by detecting a back-reflected light after exposure to over-threshold powers.

38. The method of claim 23, wherein input and output sections of said waveguide are connected via fibers prepared for fusion splicing.

39. The method of claim 23, wherein said switching device is made using HNA fibers fusion spliced to SMF fibers connecting said HNA fibers to an external input and an external output.

40. The method of claim 23, which includes a circulator for use as a "Fiber Fuse" protection device.

41. The method of claim 23, which includes a core reduction area for use as a "Fiber Fuse" protection device.

42. The method of claim 23, which includes a splitter for use as a "Fiber Fuse" protection device.

43. The method of claim 23, further comprising:
providing a mechanical splicing section having an aligning sleeve or capillary surrounding said waveguide;
attaching input and said output ends of said waveguide to each other via said mechanical splicing section; and
aligning said input and output ends with each other via said aligning sleeve
aligning said input and output ends with each other via said V-groove.

44. The method of claim 23, further comprising detecting a back-reflected light after exposure to over-threshold power.

45. The method of claim 23, further comprising detecting a continuity of a thin metallic film across a core of said waveguide after exposure to over-threshold powers.

46. A method of preventing the transmission of light within an optical waveguide when optical signals are propagated through the waveguide with an optical power level above a predetermined threshold, the method comprising
providing an optical waveguide having an input section and an output section, the two sections forming a pair of opposed surfaces extending transversely through the axes of said waveguide sections with a thin, substantially transparent layer of electrically conductive material extending transversely across the axis of said waveguide, said layer of conductive material comprising aggregates of nano-particles of said electrically conductive materials causing a catastrophic breakdown said electrically conductive material when said aggregates of nano-particles of said electrically conductive material are exposed to optical signals having a power level above a predetermined threshold, said catastrophic breakdown damaging said waveguide sufficiently to render said waveguide substantially opaque to light propagating within said optical waveguide so as to substantially prevent the transmission of such light.

47. A method for switching an optical energy device, comprising:
providing an optical waveguide having an input section and an output section,
forming a pair of opposed surfaces transversely through the axes of said waveguide sections, and
disposing a thin, substantially transparent layer of electrically conductive material between said opposed surfaces, said electrically conductive material comprising aggregates of nano-particles of said electrically conductive materials forming a plasma between said opposed surfaces when said aggregates of nano-particles of said electrically conductive material are exposed to optical signals propagating within said optical waveguide with an optical power level above a predetermined threshold, said plasma damaging said opposed surfaces sufficiently to render said surface substantially opaque to light propagating within said optical waveguide.

* * * * *

UNITED STATES PATENT AND TRADEMARK OFFICE
CERTIFICATE OF CORRECTION

PATENT NO. : 7,162,114 B2
APPLICATION NO. : 10/507575
DATED : January 9, 2007
INVENTOR(S) : Ariela Donval et al.

It is certified that error appears in the above-identified patent and that said Letters Patent is hereby corrected as shown below:

Assignee: "KiloLampda Technologies Ltd." should read --KiloLambda Technologies Ltd.--

Signed and Sealed this

Tenth Day of April, 2007

JON W. DUDAS
*Director of the United States Patent and Trademark Office*